(12) United States Patent
Ichino et al.

(10) Patent No.: US 8,654,626 B2
(45) Date of Patent: Feb. 18, 2014

(54) PACKET SORTING DEVICE, RECEIVING DEVICE AND PACKET SORTING METHOD

(75) Inventors: Kiyohisa Ichino, Tokyo (JP); Norio Yamagaki, Tokyo (JP)

(73) Assignee: NEC Corporation, Tokyo (JP)

( * ) Notice: Subject to any disclaimer, the term of this patent is extended or adjusted under 35 U.S.C. 154(b) by 18 days.

(21) Appl. No.: 13/198,630

(22) Filed: Aug. 4, 2011

(65) Prior Publication Data

US 2011/0286461 A1    Nov. 24, 2011

Related U.S. Application Data

(63) Continuation of application No. PCT/JP2010/072673, filed on Dec. 16, 2010.

(30) Foreign Application Priority Data

Jan. 7, 2010    (JP) .................................. 2010-001852

(51) Int. Cl.
| | |
|---|---|
| *G01R 31/08* | (2006.01) |
| *H04L 12/28* | (2006.01) |
| *H04L 12/54* | (2013.01) |
| *G06F 15/16* | (2006.01) |
| *G06F 15/173* | (2006.01) |
| *G06F 11/00* | (2006.01) |
| *G06F 3/00* | (2006.01) |

(52) U.S. Cl.
USPC .......... 370/216; 370/394; 370/412; 370/429; 709/232; 709/238; 714/51; 710/29

(58) Field of Classification Search
USPC .......... 370/394, 412, 429, 216; 709/232, 238; 714/51; 710/29
See application file for complete search history.

(56) References Cited

U.S. PATENT DOCUMENTS

| | | | | |
|---|---|---|---|---|
| 6,728,247 | B1 * | 4/2004 | Meyer et al. ................. | 370/394 |
| 6,738,379 | B1 * | 5/2004 | Balazinski et al. ........... | 370/394 |
| 7,787,500 | B2 * | 8/2010 | Tsuchinaga et al. .......... | 370/516 |
| 2004/0085963 | A1 * | 5/2004 | Ying .............................. | 370/394 |
| 2006/0221974 | A1 * | 10/2006 | Hilla et al. .................... | 370/394 |
| 2007/0079207 | A1 | 4/2007 | Seidel et al. | |
| 2007/0106924 | A1 | 5/2007 | Seidel et al. | |

FOREIGN PATENT DOCUMENTS

| | | |
|---|---|---|
| JP | 9-200290 A | 7/1997 |
| JP | 2003-333073 A | 11/2003 |
| JP | 2004-135076 A | 4/2004 |
| JP | 2007-013510 A | 1/2007 |
| JP | 2007-028653 A | 2/2007 |

OTHER PUBLICATIONS

Written Opinion of ISA dated Mar. 15, 2011 (and English Translation Thereof).

* cited by examiner

*Primary Examiner* — Alpus H Hsu
*Assistant Examiner* — Anthony Luo
(74) *Attorney, Agent, or Firm* — McGinn Intellectual Property Law Group, PLLC (57) ABSTRACT

A packet sorting device includes: a buffer for storing packets belonging to a plurality of communication flows; and a control section which determines, when receiving one of a series of packets, whether the one of the received packets is a disorder packet by a determination process, and sorts the received packets in a correct order by storing the disorder packet and communication flow information thereof in the buffer so that the disorder packet and communication flow identification information are correlated. The disorder packet is one of the received packets which is received in an order different from a transmission order of the packets. The communication flow information identifies the plurality of communication flows.

15 Claims, 10 Drawing Sheets

| TIME | CONTENTS OF FLOW INFORMATION TABLE 21 | CONTENTS OF SORTING BUFFER 22 |
|---|---|---|
| INITIAL STATE | EMPTY | EMPTY |
| AT TIMING WHEN PROCESS ON PACKET #1 IS COMPLETED | 40: FLOW INFORMATION ENTRY<br>41: FLOW INFORMATION = FLOW "A"<br>42: EXPECTED SEQUENCE NUMBER = 2<br>43: ACCUMULATED PACKET NUMBER = 0 | EMPTY |
| AT TIMING WHEN PROCESS ON PACKET #4 IS COMPLETED | 40: FLOW INFORMATION ENTRY<br>41: FLOW INFORMATION = FLOW "A"<br>42: EXPECTED SEQUENCE NUMBER = 2<br>43: ACCUMULATED PACKET NUMBER = 1 | 50: PACKET ENTRY<br>51: FLOW INFORMATION = FLOW "A"<br>52: SEQUENCE NUMBER = 4<br>53: PACKET = PACKET #4 |
| AT TIMING WHEN PROCESS ON PACKET #2 IS COMPLETED | 40: FLOW INFORMATION ENTRY<br>41: FLOW INFORMATION = FLOW "A"<br>42: EXPECTED SEQUENCE NUMBER = 3<br>43: ACCUMULATED PACKET NUMBER = 1 | 50: PACKET ENTRY<br>51: FLOW INFORMATION = FLOW "A"<br>52: SEQUENCE NUMBER = 4<br>53: PACKET = PACKET #4 |
| AT TIMING WHEN PROCESS ON PACKET #3 IS COMPLETED | 40: FLOW INFORMATION ENTRY<br>41: FLOW INFORMATION = FLOW "A"<br>42: EXPECTED SEQUENCE NUMBER = 5<br>43: ACCUMULATED PACKET NUMBER = 0 | EMPTY |

PACKET SORTING DEVICE, RECEIVING DEVICE AND PACKET SORTING METHOD

CROSS-REFERENCE TO RELATED APPLICATION

This application is a continuation of International Application No. PCT/JP2010/072673, filed on Dec. 16, 2010.

BACKGROUND OF THE INVENTION

1. Field of the Invention

The present invention relates to a communication packet receiving device, more particularly, to a receiving device in which communication packets received in the order different from transmission order are sorted into the transmission order.

2. Description of the Related Art

The packet communication network is a communication network in which finely divided data are accommodated in communication packets (referred to as packets, hereinafter), and communication packets are exchanged among transmitting/receiving devices. For example, the Internet is a representative packet communication network. A packet communication network is configured by connecting multiple transmission devices to each other. Examples of transmission devices include a network router (referred to as router, hereinafter) and a network switch (referred to as switch, hereinafter), which are used to transfer packets to the transmission destinations.

In a packet communication network, a communication packet may be discarded or destroyed in the transmission. This results from congestion of processes in a router or a switch which transfers the packet, sensitivity reduction in receiving a signal sent from a transmission line by which devices are connected, effects of external electromagnetic, or the like. In general, a packet loss caused by discard and destruction is detected by a protocol which operates in an application layer or a transport layer. Such a protocol control allows retransmitting a lost packet to ensure the integrity of data.

A retransmission of a packet results in that a packet which was transmitted earlier may arrive at the receiving device later than a packet which was transmitted later. That is, the order in transmitting packets may differ from the order in receiving them. Such a state is called packet disorder. However, it is expected in many applications to have no packet disorder. Therefore, if a packet disorder occurs, the receiving device sorts the packets in the transmission order, and transfers the data to an application in the correct order. For example, the transmitting device transmits packets with which sequence numbers indicating the packet transmission order are attached. The receiving device sorts the packets in the correct order by referring to the sequence numbers. At this time, the receiving device needs to have a memory (referred to as sorting buffer, hereinafter) for temporarily storing received packets for which a packet disorder occurs, in order to sort the packets properly.

Figure 1:
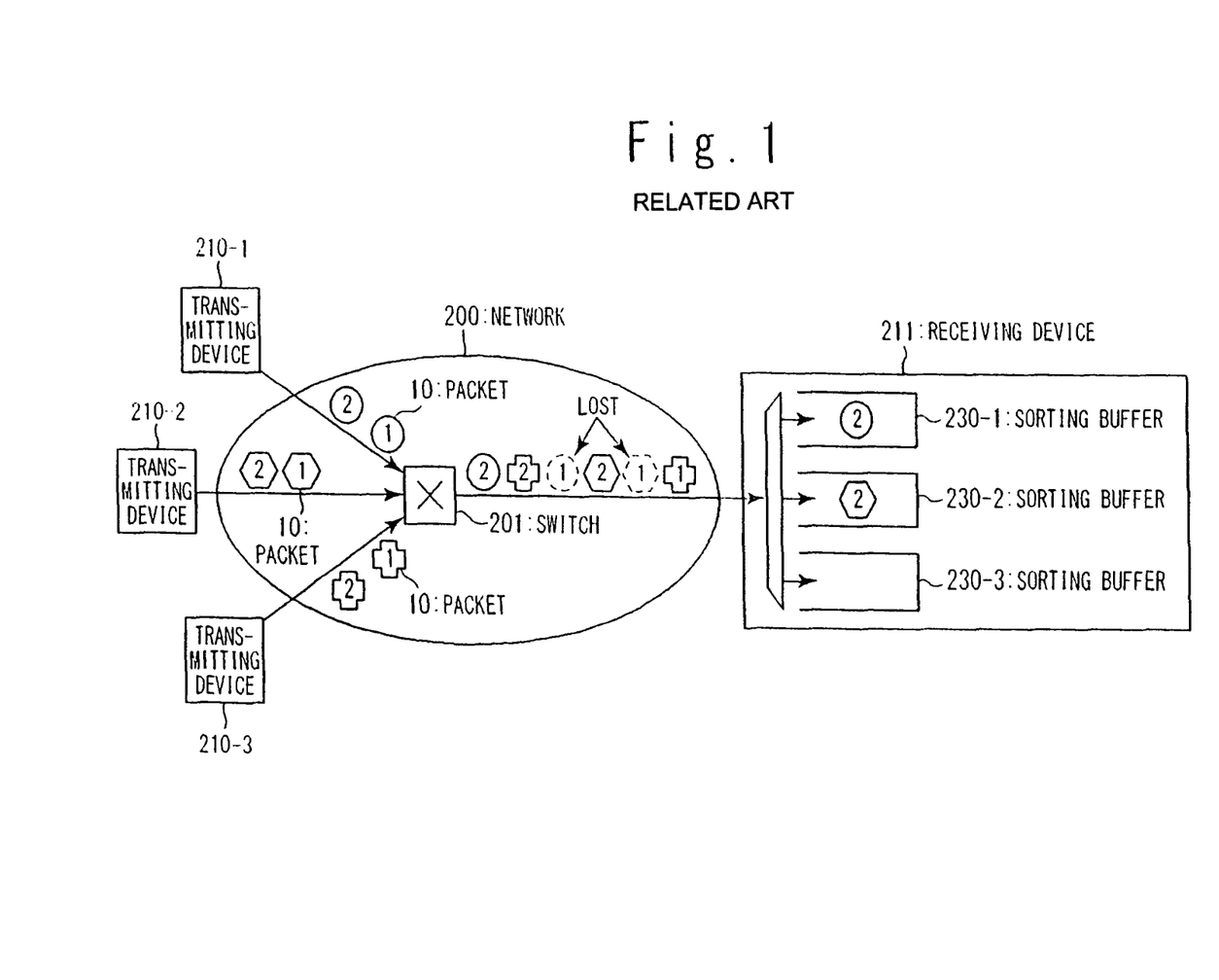
FIG. 1 is a conceptual diagram showing a situation in which a general receiving device receives packets sent from a plurality of transmitting devices.

It should be noted that a packet communication is not necessarily carried out in the one-to-one correspondence between transmitting/receiving devices. In general, a plurality of communication devices exchange packets one another. FIG. 1 is a conceptual diagram showing a situation in which a general receiving device receives packets from a plurality of transmitting devices. Referring to FIG. 1, there is shown a situation in which a receiving device 211 receives packets 10 from three transmitting devices 210-1 to 210-3 via a network 200. In FIG. 1, the packets 10 are shown with different shapes for the transmitting devices 210-1 to 210-3 for distinction. The numbers described in the packets 10 indicate sequence numbers 31 attached to the packets 10. The packets 10 transmitted by the plurality of the transmitting devices 210-1 to 210-3 are transferred to the receiving device 211 by a switch 201. The packets 10 may be lost resulting from discard and/or destruction in the transfer process.

The receiving device 211 includes sorting buffers 230-1 to 230-3; the number of the sorting buffers 230-1 to 230-3 corresponds to the number of the transmitting devices 210-1 to 210-3 with which the receiving device 211 is communicating. This is because the sequence numbers 31 of the packets 10 transmitted from the transmitting devices 210-1 to 210-3 have no correlation each other and the same sequence number 31 may be given to packets 10 transmitted from the different transmitting devices 210-1 to 210-3. The receiving device 211 needs to manage the sequence numbers 31 of packets 10 received from the respective transmitting devices 210-1 to 210-3, individually.

Shown here is an example in which the sequence numbers 31 are given in units of the transmitting devices 210-1 to 210-3, for simplicity; however, a plurality of application programs may be executed simultaneously on the transmitting devices 210-1 to 210-3. In addition, each application may further open a plurality of communication connections. In such cases, the receiving device 211 needs to manage the sequence numbers 31 for each connection.

In the following explanation, a flow is defined as a set of the packets 10 to which a series of the sequence numbers 31 are given. Flows are identified in units of transmitting/receiving devices, users, links, carrier wave frequencies, connections, sessions, and applications or the like, or in units of a combination thereof. It can be said that the required number of the sorting buffers 230-1 to 230-3 in the receiving device 211 is equal to the number of flows for which the receiving device 211 provides communications. The following techniques are disclosed for sorting the packets 10 by using the sorting buffers 230-1 to 230-3 prepared for each flow in this manner.

Figure 2:
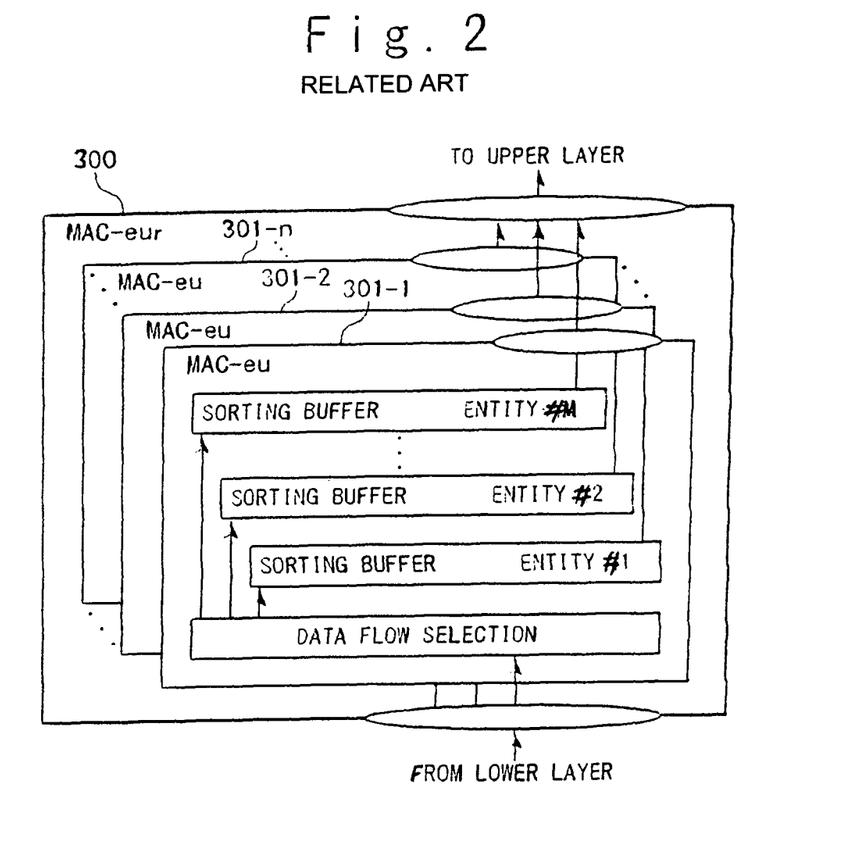
FIG. 2 shows the configuration of an MAC sub-layer of an RNC which constitutes an UTRAN in a mobile communication network disclosed in patent literature 1.

Japanese Patent Application Publication No. P2007-028653A (patent literature 1) discloses a data reception method to avoid an erroneous reproduction of data packets in a packet retransmission protocol in a receiver. The data reception method disclosed in patent literature 1 relates to an automatic retransmitting control which is called HARQ (hybrid automatic repeat-request) in a mobile communication. FIG. 2 shows the configuration of a MAC (media access control) sub-player of an RNC (radio network controller) which constitutes an UTRAN (UMTS terrestrial radio access network) in a mobile communication network disclosed in patent literature 1. The MAC sub-player 300 is called MAC-eu 301-1 to 301-n. Each of the MAC-eu301-1 to 301-n shown in FIG. 2 is associated with one user. In patent literature 1, the number of sorting buffer entities provided in the RNC is equal to the product of the number of users and the number of flows per one user. Therefore, the RNC in patent literature 1 includes sorting buffers which correspond to the total number of the flows.

In the technique of patent literature 1, the capacity of the sorting buffers is proportional to the total number of flows in the receiving device. Therefore, a receiving device which often deals with a large number of flows, such as a server, suffers from a problem that a large memory capacity is consumed for sorting buffers.

In general, a memory with a small capacity operates at a higher speed than that of a memory with a large capacity. When the required memory capacity is small, a high-speed memory, such as a cache memory in a microprocessor and an SRAM (static random access memory) can be used as sorting buffers. When the use of such a high-speed memory results in an insufficient capacity, on the other hand, it is inevitable to use a relatively low-speed memory, such a DRAM (dynamic random access memory), as a sorting buffer.

When the packets 10 are sorted for a large number of flows as in patent literature 1, the memory resource is consumed excessively for the sorting buffers. Accordingly, it is inevitable to use a low-speed memory with a large capacity. Therefore, the time required for memory access related to the packet sorting process is increased, causing a problem of reduction of the sorting process speed.

It should be noted that Japanese Patent Application Publication No. P2007-013510A (patent literature 2) discloses a packet communication system in which a high quality service can be provided inexpensively even when a communication packet is delayed or lost, or a communication failure occurs.

SUMMARY OF INVENTION

The present invention has been invented by taking the above circumstances into consideration; an objective of the present invention is to realize a packet sorting device which can reduce a memory resource used in a process of sorting received packets.

In an aspect of the present invention, a packet sorting device is provided. The packet sorting device includes: a buffer for storing packets belonging to a plurality of communication flows; and a control section which determines, when receiving one of a series of packets, whether the one of the received packets is a disorder packet by a determination process, and sorts the received packets in a correct order by storing the disorder packet and communication flow information thereof in the buffer so that the disorder packet and communication flow identification information are correlated. The disorder packet is one of the received packets which is received in an order different from a transmission order of the packets. The communication flow information identifies the plurality of communication flows.

In another aspect of the present invention, a receiving device is provided which has the above-described packet sorting device.

In still another aspect of the present invention, a packet sorting method to be implemented in a packet sorting device is provided. The packet sorting device includes a buffer for storing packets belonging to a plurality of communication flows. The packet sorting method includes: receiving a series of packets; upon reception of one of the received packets, determining whether the one of the received packets is a disorder packet by a determination process; storing the disorder packet and communication flow identification of the one of the received packets in the buffer so that the disorder packet and the communication flow identification thereof are correlated; and outputting the received packets after sorting the received packets in a correct order. The disorder packet is one of the received packets which is received in an order different from a transmission order of the packets. The communication flow information identifies the plurality of communication flows.

The present invention, it is possible to realize a packet sorting device capable of saving a memory resource used in a process of sorting out a received packet. It is also made possible to use a high-speed memory with a small capacity as a sorting buffer because only a small capacity is required for a memory resource, thereby making it possible to enhance the speed of a sorting process.

BRIEF DESCRIPTION OF THE DRAWINGS

Object, effects, and features of the above invention will be more clarified from descriptions of embodiments in cooperation with accompanying drawings in which.

DESCRIPTION OF PREFERRED EMBODIMENTS

Referring to the accompanying drawings, a packet sorting device according to embodiments of the present invention will be explained below.

[Configuration of Communication Network]

Figure 3:
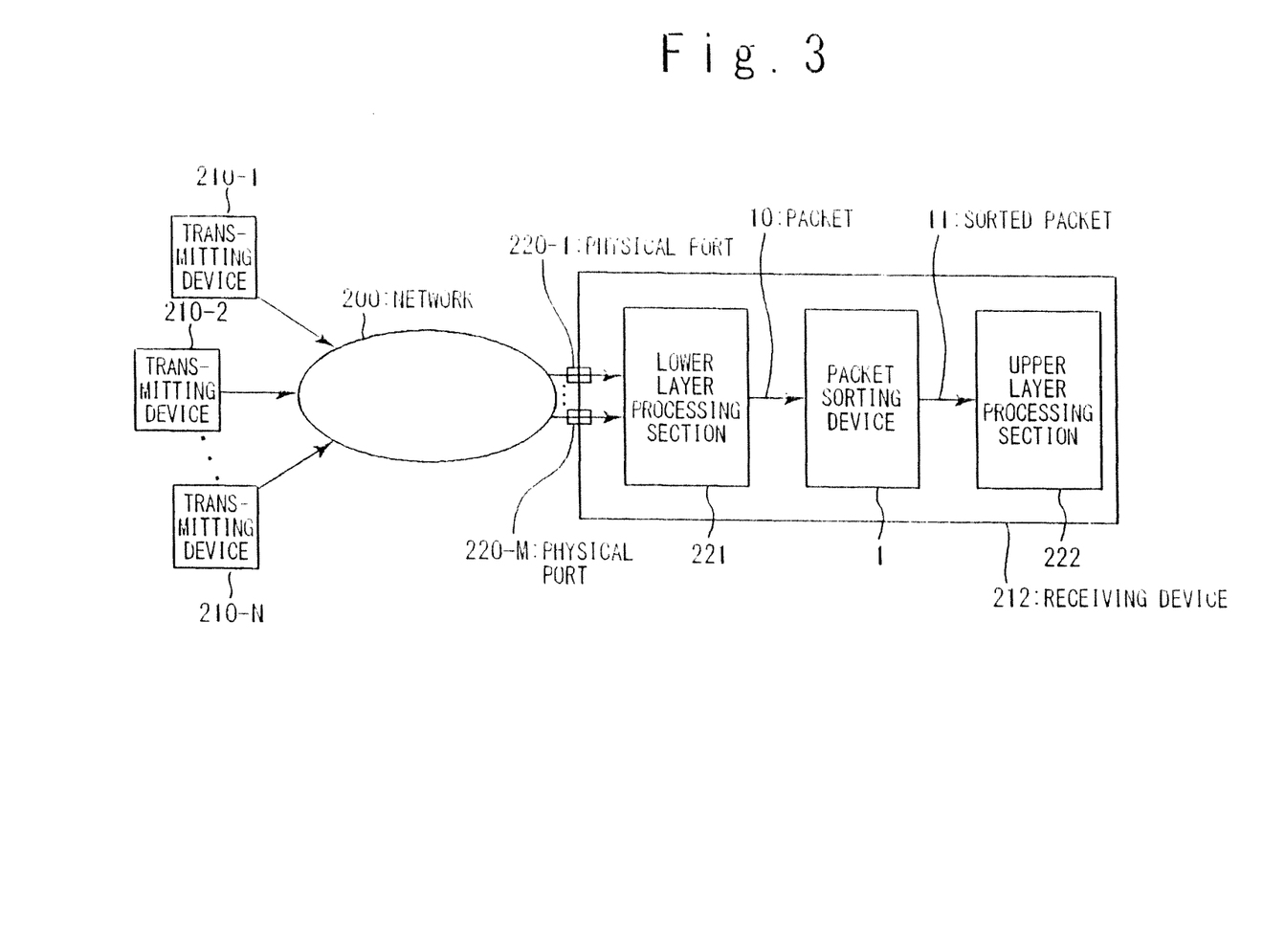
FIG. 3 shows a communication network to which a packet sorting device 1 in an embodiment of the present invention is applied.

First, a description is given of a communication network to which a packet sorting device 1 according to an embodiment of the present invention is applied. FIG. 3 shows a communication network to which the packet sorting device 1 according to the present embodiment is applied.

The communication network shown in FIG. 3 includes transmitting devices 210-1 to 210-N (N is a natural number), a network 200, and a receiving device 212. In the following, the reference number "210" is used to simply refer to any of the transmitting devices.

The network 200 transfers packets 10 exchanged between the transmitting devices 210-1 to 210-N and the receiving device 212. The network 200 transfers the packets 10 to the appropriate transmission destinations along predetermined transfer paths or in accordance with destination information included in the packets 10. There is a possibility that a packet 10 is lost or a disorder of the packets 10 occurs, in the network 200.

Furthermore, the transmitting devices 210 exchange the packets 10 with the receiving device 212 via the network 200. The packets 10 each accommodate flow information 30 and a sequence number 31 in the header or the payload thereof. The flow information 30 is information to identify the flow to which the packet 10 belongs. The flow information 30 is incorporated into the packet 10 by the transmitting device 210. Examples of the flow information 30 include an IP (internet protocol) address, a port number, a user identifier, and an application identifier of a transmission/receiving device or the like, or a combination thereof. It should be noted that the flow information 30 is not limited to these examples as long as the flow to which the packet 10 belongs can be identified.

The sequence numbers 31 indicate the transmission order of the packets 10 in each flow. The transmitting device 210 provides the sequence number 31 for each packet. The transmitting device 210 has the function of detecting a loss of a transmitted packet 10 and retransmitting the packet 10 which was lost. The transmitting device 210 may also detect a loss of a packet 10 by a notification sent from the receiving device 212. The transmitting device 210 retransmits a packet 10 provided with the sequence number 31 which is the same as the sequence number 31 provided for the lost packet 10.

It should be noted the sequence numbers 31 are not necessarily continuous numbers, such as "1, 2, 3, . . . ". The initial value of the sequence numbers 31 may be any value determined in each flow. However, the initial value of the sequence numbers 31 needs to match between the transmitting device 210 and the receiving device 212.

In addition, the receiving device 212 includes a lower layer processing section 221, the packet sorting device 1, a higher layer processing section 222, and physical ports 220-1 to 220-M (M is a natural number). In the following, the reference number "220" is used to simply refer to any of the physical ports. The physical ports 220-1 to 220-M provide connections between the network 200 and the receiving device 212.

The lower layer processing section 221 carries out a detection process of the packets 10 by performing processes of the physical layer and the link layer, each of which is a lower layer, on the input signals inputted from the physical ports 220. The lower layer processing section 221 outputs the detected packets 10 to the packet sorting device 1. The process for detecting the packets 10 by the lower layer processing section 221 using the input signals is a well-known technique and no explanation thereof is given herein.

The packet sorting device 1 sorts out the packets 10 in the order in which the packets 10 are transmitted by the transmitting device 210. The packet sorting device 1 outputs the packets 10 sorted in the correct order as sorted packets 11 to the higher layer processing section 222. The configuration of the packet sorting device 1 will be explained later in detail.

The higher layer processing section 222 performs a process for the application layer, which is a higher layer, on the sorted packets 11 received from the packet sorting device 1. Here, the process for the application layer includes processes for the session layer and the presentation layer, achieving transfer of data to an application and performing an application function. The process for the application layer by the higher layer processing section 222 is a well-known technique and no description thereof is given herein. It should be noted that the receiving device 212 may not necessarily include the higher layer processing section 222.

[Configuration of Packet Sorting Device]

Figure 4:
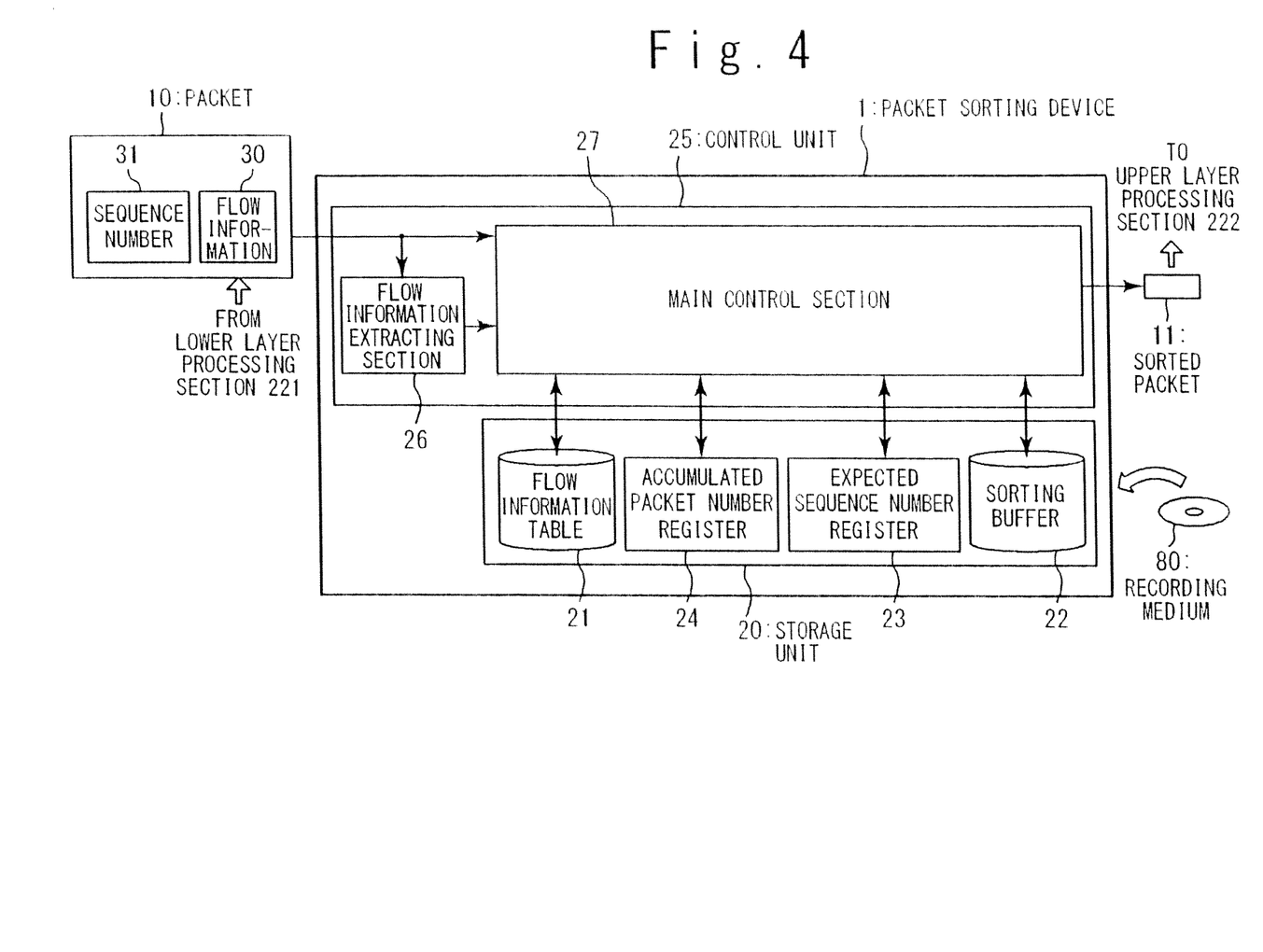
FIG. 4 shows the configuration of the packet sorting device 1 in an embodiment of the present invention.

A description is next given of the configuration of the packet sorting device 1 in the present embodiment, which is applied to the above-mentioned communication network. FIG. 4 shows the configuration of the packet sorting device 1 in the present embodiment. The packet sorting device 1 includes a storage unit 20 and a control unit 25.

First, a description is given of the storage unit 20. The storage unit 20 stores computer programs and data for realizing the function of the packet sorting device 1. Examples of the storage unit 20 include a RAM (random access memory), a ROM (read only memory), and an HDD (hard disk drive). The storage unit 20 includes a flow information table 21, a sorting buffer 22, an expected sequence number register 23, and an accumulated packet number register 24. The respective configurations thereof will be explained below.

Figure 5:
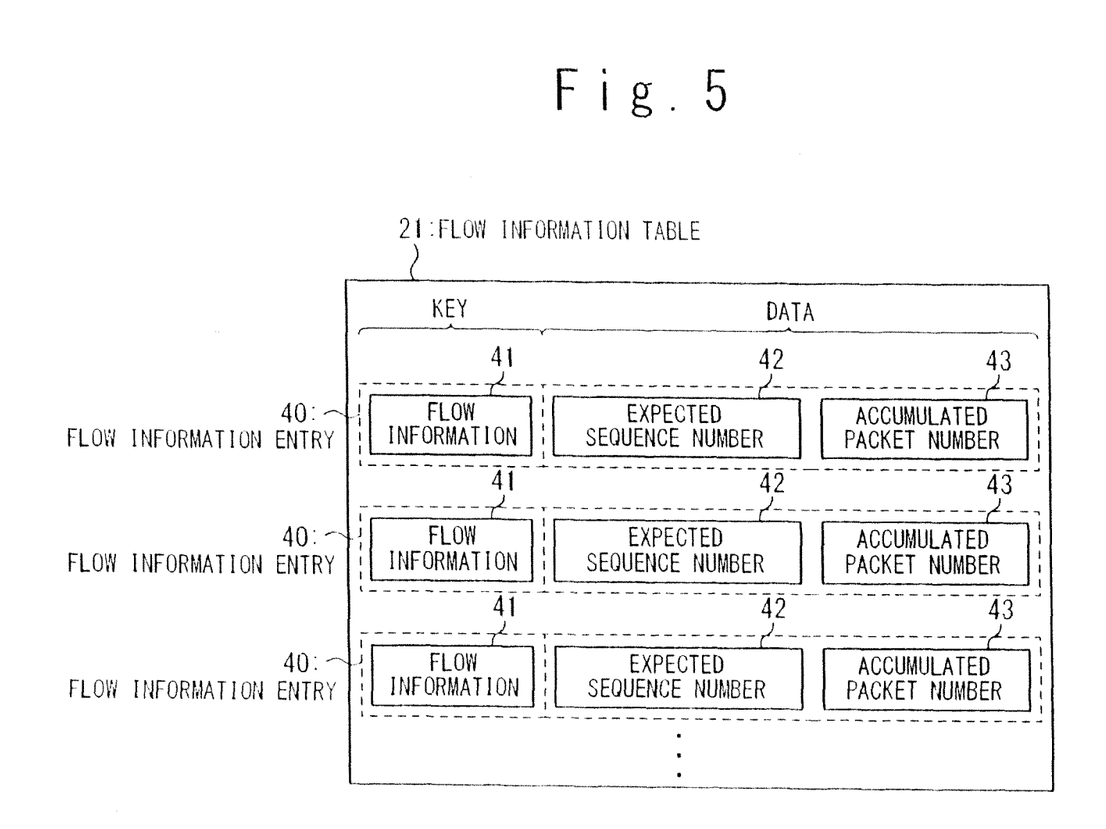
FIG. 5 shows a flow information table 21 in an embodiment of the present invention.

The flow information table 21 stores the flow information 30 of packets 10 which are being transmitted between the receiving device 212 and the transmitting devices 210. FIG. 5 shows the flow information table 21 in the present embodiment. The flow information table 21 stores flow information entries 40. The flow information entries 40 are each associated with one of flows for which the receiving device 212 provides communications. The flow information entries 40 each record a set of flow information 41, an expected sequence number 42, and an accumulated packet number 43. It should be noted that the flow information table 21 is empty in the initial state.

The flow information 41 indicates the flow information 30 stored in a packet 10. The flow information 41 is extracted from a packet 10 and recorded in the flow information table 21. The expected sequence number 42 indicates an expected value of the sequence number 31 which is to be stored in the packet 10 to be received next in the flow identified by the flow information 41. That is, if the sequence number 31 stored in a packet 10 matches the expected sequence number 41, it means the packet 10 is received in the transmission order. The accumulated packet number 43 indicates the number of the packets 10 accumulated in the sorting buffer 22 associated with the flow information 41.

Figure 6:
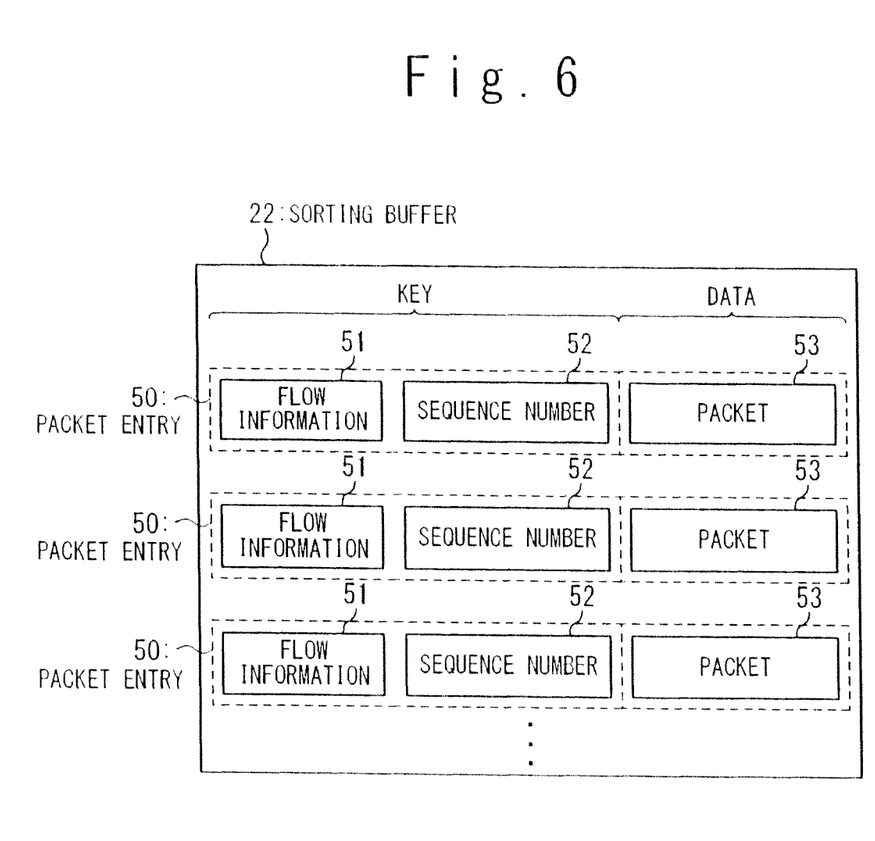
FIG. 6 shows a sorting buffer 22 in an embodiment of the present invention.

The sorting buffer 22 accumulates packets 10 received by the packet sorting device 1 in a wrong order. Here, to receive in the wrong order means to receive in an order different from the transmission order of the transmitting device 210. FIG. 6 shows the sorting buffer 22 in the present embodiment. The sorting buffer 22 includes packet entries 50. The packet entries 50 are each associated with one of the packets 10 received by the packet sorting device 1 in the wrong order. The packet entries 50 each record a set of flow information 51, a sequence number 52, and a packet 53, which are associated with the relevant packet 10. It should be noted that the sorting buffer 22 is empty in the initial state.

The flow information 51 indicates the flow information 30 stored in a packet 10. The flow information 51 is extracted from the packet 10 and recorded in the sorting buffer 22. The sequence number 52 indicates the sequence number 31 stored in the packet 10. The sequence number 52 is extracted from the packet 10 and recorded in the sorting buffer 22. The packet 53 is a copy of the packet 10. The packet 53 is generated by storing the packet 10 itself in the sorting buffer 22.

The expected sequence number register 23 holds the expected sequence number 42. The expected sequence number register 23 holds the value of the expected sequence number 42 which is stored in the flow information table 21 and correlated to the flow information 30 of a packet 10 which is currently being processed by the main control section 27. In the expected sequence number register 23, the expected sequence number 42 is written by the main control section 27.

The accumulated packet number register 24 holds the packet accumulated number 43. The accumulated packet number register 24 holds a value of the accumulated packet number 43 which is stored in the flow information table 21 and correlated to the flow information 30 of a packet 10 which is currently being processed by the main control section 27. In the accumulated packet number register 24, the accumulated packet number 43 is written by the main control section 27. The storage unit 20 is as explained above.

A description is next given of the control unit 25. An example of the control unit 25 is a CPU (central processing unit). The control unit 25 realizes the function of the packet sorting device 1 by executing computer programs stored in the storage unit 20. The control unit 25 includes a flow information extracting section 26 and a main control section 27. These configurations will be explained below.

The flow information extracting section 26 receives packets 10 from the lower layer processing section 221 and obtains the flow information 30 and the sequence numbers 31 stored in the packets 10. The flow information extracting section 26 outputs, to the main control section 27, the flow information 30 and the sequence numbers 31 obtained from the packets 10.

The main control section 27 performs a process for sorting out the packets 10. The main control section 27 receives the packets 10 from the lower layer processing section 221. The main control section 27 refers to the flow information 30 and the sequence numbers 31 inputted from the flow information extracting section 26 and performs a process for sorting out the packets 10. The main control section 27 outputs the packets 10 subjected to the sorting process as the sorted packets 11 to the higher layer processing section 222. The control unit 25 is as explained above.

It should be noted that the packet sorting device 1 may be realized by software as stated above or may be realized by hardware. Alternatively, the packet sorting device 1 may be realized by a combination of hardware and software. When being implemented as hardware components, the storage unit 20 and the control unit 25 may be realized as devices, such as circuit boards and memory chips.

When the packet sorting device 1 is implemented as software, computer programs to be stored in the storage unit 20 may be recorded in a recording medium 80. Examples of the recording medium 80 include a hard disk drive and a ROM of the packet sorting device 1. The computer programs may be recorded temporarily or permanently in a removable recording medium 80, such as a CD-ROM (compact disc read only memory). The computer programs are directly installed onto the packet sorting device 1 from the removable recording medium 80. The computer programs may be installed onto the packet sorting device 1 from an application download server via a network. The configuration of the packet sorting device 1 in the present embodiment is as explained above.

[Operation of Packet Sorting Device 1]

Figure 7:
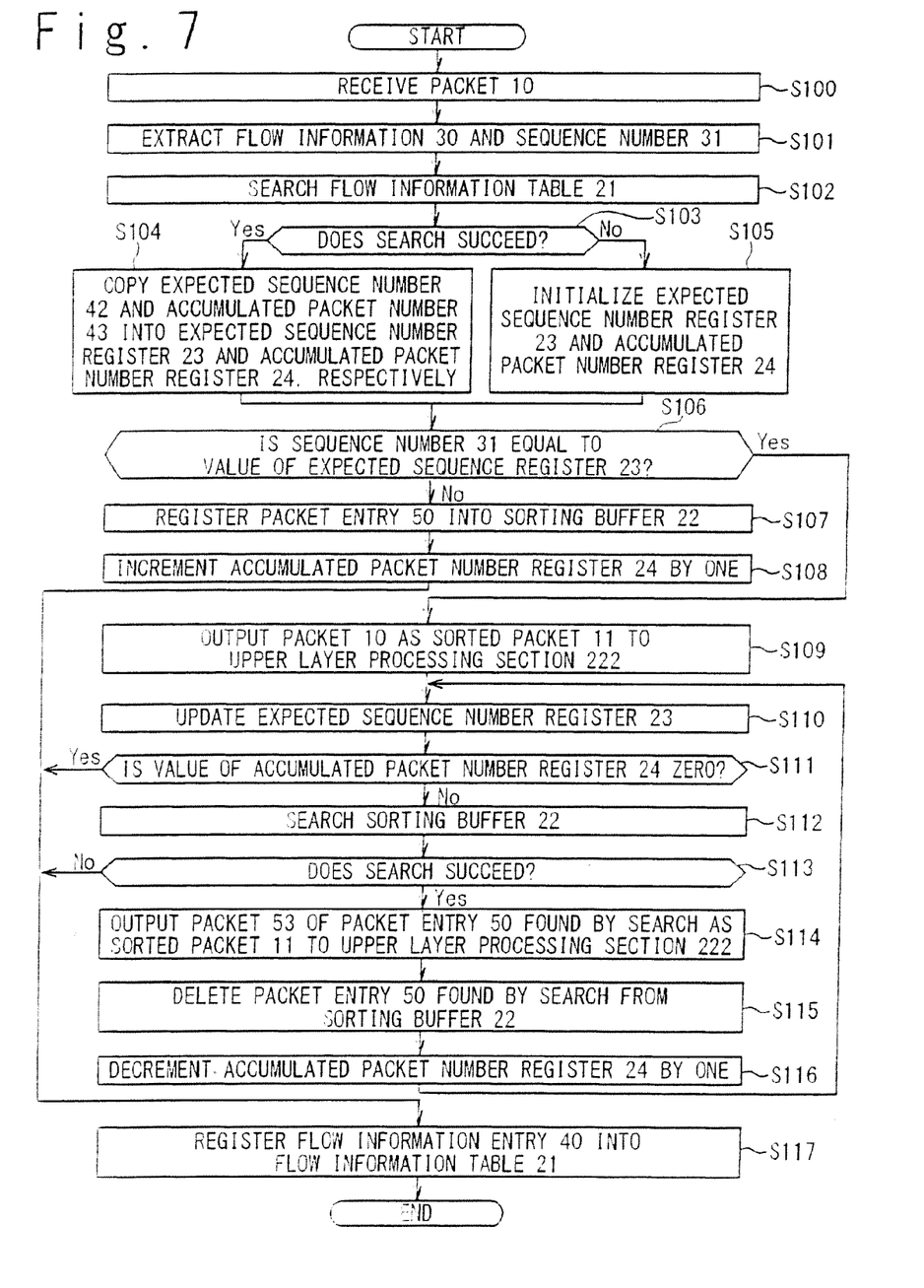
FIG. 7 shows an operation flow of the packet sorting device 1 in an embodiment of the present invention.

Next, a description is given of the operation of the packet sorting device 1 configured as stated above in the present embodiment. FIG. 7 shows the operation procedure of the packet sorting device 1 in the present embodiment.

The packet sorting device 1 receives a packet 10 from the lower layer processing section 221 (step S100). The packet 10 is inputted to the flow information extracting section 26 and the main control section 27. The flow information extracting section 26 extracts the flow information 30 and the sequence number 31 from the packet 10 (step S101). The flow information extracting section 26 outputs the extracted flow information 30 and sequence number 31 to the main control section 27. The main control section 27 searches the flow information table 21 to determine whether flow information 41 which matches the flow information 30 inputted from the flow information extracting section 26 is present (step S102). The main control section 27 determines whether there is the matching flow information 41 (step S103). If there is, the search results in success and the procedure jumps to step S104. If not, on the other hand, the search results in failure and the procedure jumps to step S105.

When any flow information 41 matches the flow information 30 in the flow information table 21 ("Yes" at step S103), the main control section 27 copies the expected sequence number 42 described in the flow information entry 40 associated with the flow information 41 into the expected sequence number register 23, and the accumulated packet number 43 described therein into the accumulated packet number register 24 (step S104). When no flow information 41 matches the flow information 30 in the flow information table 21 ("No" at step S103), the main control section 27 initializes the expected sequence number register 23 and the accumulated packet number register 24 (step S105). Here, the initial value of the expected sequence number register 23 is equal to the initial value of the sequence numbers 31 of the flow identified by the flow information 30 of the packet 10 which is being processed. Also, the initial value of the accumulated packet number register 24 is "0".

This is followed by determining whether or not the value of the sequence number 31 of the packet 10 is equal to the value of the expected sequence number register 23 by the main control section 27 (step S106). If so, the procedure jumps to step S109. If not, the procedure jumps to step S107. When the value of the sequence number 31 of the packet 10 is not equal to the value of the expected sequence number register 23 ("No" at step S106), the main control section 27 causes the sorting buffer 22 to register a packet entry 50 (step S107). This is because it can be considered from a mismatch between the expected value of the sequence number and the actual sequence number that a disorder of the packets 10 occurs.

Here, as stated above, the flow information 51, the sequence number 52, and the packet 53 are recorded in the packet entry 50. The flow information 51 and the sequence number 52 in this case are the flow information 30 and the sequence information 31 accommodated in the packet 10 which is being processed by the main control section 27. The packet 53 is a copy of the packet 10. The main control section 27 increments the accumulated packet number register 24 by "1" (step S108). Thereafter, the procedure moves onto step S117.

When the value of the sequence number 31 of the packet 10 is equal to the value of the expected sequence number register 23 ("Yes" at step S106), the main control section 27 outputs the packet 10 as the sorted packet 11 to the higher layer processing section 222 (step S109). Since the expected value of the sequence number matches the actual sequence number, the packet 10 is determined as being received in the correct order. Thereafter, the main control section 27 updates the value of the expected sequence number register 23 to the expected value of the sequence number 31 of the packet 10 which is to be received next in the flow to which the already-processed packet 10 belongs (step S110). For example, when the sequence numbers 31 are given in a manner in which the sequence numbers 31 are generated by incrementing by "1" (such as "1, 2, 3, . . . "), the main control section 27 increments the value of the expected sequence number register 23 by "1". Alternatively, when the sequence numbers 31 are calculated by using information of the packets 10 or other information, the main control section 27 updates the value of the expected sequence number register 23 to the value computed by the calculation.

This is followed by determining whether the value of the accumulated packet number register 24 is "0" by the main control section 27 (step S111). When the value is "0", there is no packet 10 which is received in an order different from the transmission order in the sorting buffer 22. Therefore, the procedure moves onto step S117. When the value is not "0", on the other hand, there is a packet(s) 10 received in an order different from the transmission order in the sorting buffer 22. Therefore, the procedure moves onto step S112 in which the packet(s) 10 is processed.

When the value of the accumulated packet number register 24 is not "0" ("No" at step S111), the main control section 27 searches the sorting buffer 22 (step S112). The main control section 27 searches the sorting buffer 22 to find out whether there is a packet entry 50 which records flow information 51 which is identical to the flow information 30 of the packet 10 outputted as the sorted packet 11 and also records a sequence number 52 of a value which is equal to the updated value of the expected sequence number register 23. This means to confirm whether the packet 10 which follows the packet 10 just outputted to the higher layer processing section 222 is recorded in the sorting buffer 22.

The main control section 27 determines whether there is a packet entry 50 which meets the above-described condition (step S113). If there is not, the search results in failure, resulting in that the procedure flow moves onto step S117 based on the fact there is no packet entry 50 to be processed. If there is, the search results in success and the procedure moves onto step S114 in order to process the packet entry 50.

When there is an packet entry 50 which meets the above-described condition ("Yes" at step S113), the main control section 27 outputs the packet 53 of the packet entry 50 as the sorted packet 11 to the higher layer processing section 222 (step S114). This is because the packet 53 of the packet entry 50 which meets the above condition is a packet 10 which should follow the packet 10 just outputted to the higher layer processing section 222 as the sorted packet 11 immediately before. The main control section 27 deletes data of the packet entry 50 from which the packet 53 is outputted (step S115). Then, the main control section 27 decrements the accumulated packet number register 24 by "1" (step S116). Thereafter, the procedure returns to the step S110.

The procedure moves onto step S117 after step S108 is completed, when step S111 results in "Yes" or when step S113 falls in "No". The main control section 27 resisters a flow information entry 40 into the flow information table 21 (step S117). The main control section 27 registers the value of the expected sequence number register 23 and the value of the accumulated packet number register 24 into the flow information table 21 so as to be correlated to the flow information 30 of the packet 10 which is just processed. At this time, when there is flow information 41 which matches the flow information 30 of the already processed packet 10 in the flow information table 21, the main control section 27 completes the registration by overwriting the existing data. The packet sorting device 1 thus completes the process of the received packet 10. Thereafter, when the packet sorting device 1 newly receives a packet 10 again, the process is restarted from the step S100. The operation of the packet sorting device 1 in the present embodiment is as explained above.

[Specific Operation Example of Packet Sorting Device 1]

Figure 8:
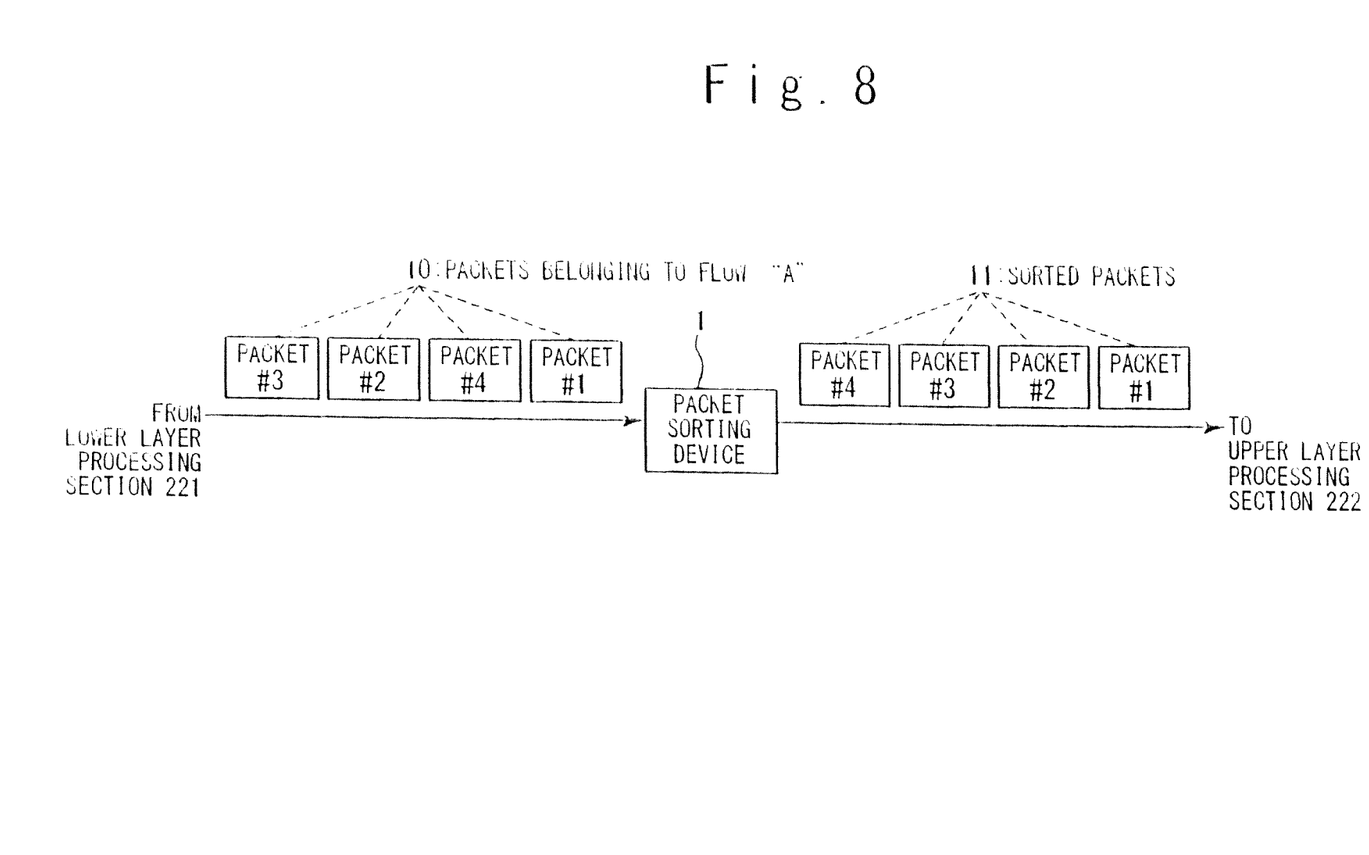
FIG. 8 shows a specific example of a process for sorting packets 10 by the packet sorting device 1 in an embodiment of the present invention.

A description is next given of how the packet sorting device 1 operates in the present embodiment, on the basis of a specific example. FIG. 8 shows a specific example of the process for sorting the packets 10 by the packet sorting device 1 in the present embodiment. Referring to FIG. 8, four of the packets 10 belonging to a "flow A" are inputted to the packet sorting device 1. The numbers "1" to "4" attached to the four packets 10 each refer to the sequence numbers 31 of the packets 10. The packets 10 are assumed to be transmitted from a transmitting device 210 in this order. The packet sorting device 1 receives the four packets in the order of "1", "4", "2" and "3".

Figure 9:
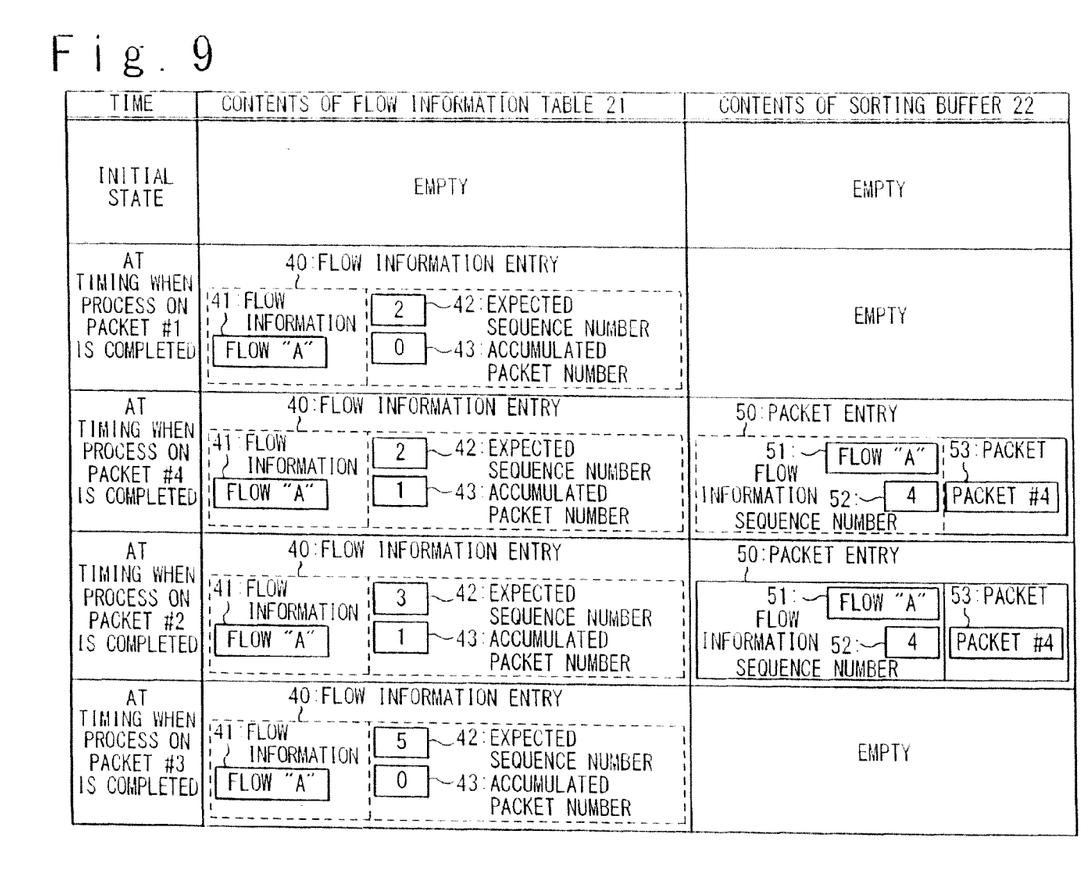
FIG. 9 shows information stored in the flow information table 21 and a sorting buffer 22 in a specific example of an embodiment of the present invention.

Therefore, it would be understood that a disorder occurs in the arriving order with respect to the packets 10 due to some reason. Each of the four packets is also assumed to describe "flow A" as the flow information 30. Also, FIG. 9 shows information stored in the flow information table 21 and the sorting buffer 22 in the specific example of the present embodiment. A description is given of how the packet sorting device 1 operates with reference to FIGS. 7, 8 and 9, by using a case of receiving the four packets 10 as an example.

Firstly, the packet sorting device 1 receives the first packet 10 belonging to the "flow A" (step S100). The flow information extracting section 26 extracts the "flow A" as the flow information 30 and "1" as the sequence number 31 from the packet 10 (step S101). The main control section 27 searches the flow information table 21 based on the "flow A" extracted by the flow information extracting section 26 (step S102). The main control section 27 determines whether there is a flow information entry 40 which records flow information 30 matching the "flow A" in the flow information table 21 (step S103). As shown in the row "INITIAL STATE" in FIG. 9, the flow information table 21 is empty at this timing; this means the search results in failure ("No" at step S103). Therefore, the main control section 27 initializes the expected sequence number register 23 and the accumulated packet number register 24 (step S105). Accordingly, the expected sequence number register 23 is set to "1" and the accumulated packet number register 24 is set to "0".

This is followed by determining, by the main control section 27, whether the value of the sequence number 31 of the received packet 10 is equal to the value of the expected sequence number register 23 (step S106). The value of the sequence number 31 of the received packet 10 and the value of the expected sequence number register 23 are both "1". Therefore, the main control section 27 determines they are equal to each other (Yes at step S106). Since the packet 10 is a packet accompanied by the expected sequence number 31, the main control section 27 outputs the packet 10 (with the sequence number 31 of "1") as a sorted packet 11 to the higher layer processing section 222 (step S109).

The main control section 27 updates the value of the expected sequence number register 23 to the expected value of the sequence number 31 of a packet which should be received next by the packet sorting device 1 in the "flow A" (step S110). In the present example, the sequence number 31 is increased in this order of "1, 2, 3, 4, ..." so that the main control section 27 increments the value of the expected sequence number register 23 by "1" so as to turn the value of the expected sequence number register 23 into "2". Thereafter, the main control section 27 determines whether or not the value of the accumulated packet register 24 is "0" (step S111). The value of the accumulated packet register 24 has been initialized and turned into "0" at step S105 ("Yes" at step S111). That is, no packets are accumulated in the sorting buffer 22. Therefore, the main control section 27 registers a flow information entry 40 into the flow information table 21 (step S117). At this time, the main control section 27 registers a new entry into the flow information table 21, using the "flow A" of the packet 10 (with the sequence number 31 of "1") for the flow information 41, "2" of the expected sequence number register 23 for the expected sequence number 42, and "0" of the accumulated packet number register 23 for the accumulated packet number 43. Therefore, the packet sorting device 1 completes processing the packet 10 with the sequence number 31 of "1". Referring to FIG. 9, one can confirm the state of the flow information table 21 and the sorting buffer 22 after the packet 10 with the sequence number 31 of "1" is processed (as shown in the row "AT TIMING WHEN PROCESS ON PACKET #1 IS COMPLETED" in FIG. 9).

This is followed by receiving the second packet 10 belonging to the "flow A" by the packet sorting device 1 (step S100). The flow information extracting section 26 extracts the "flow A" as the flow information 30 and "4" as the sequence number 31 from the packet 10 (step S101). The main control section 27 searches the flow information table 21 based on the "flow A" extracted by the flow information extracting section 26 (step S102). The main control section 27 determines whether there is a flow information entry 40 which records flow information 41 matching the "flow A" in the flow information table 21 (step S103). As shown the row "AT TIMING WHEN PROCESS ON PACKET #1 IS COMPLETED" in FIG. 9, there is a flow information entry 40 corresponding to the "flow A" in the flow information table 21 at this time, whereby the search results in success (Yes at step S103). Therefore, the main control section 27 copies the value of the expected sequence number 42 and the value of the accumulated packet number 43 in the flow information entry 40 identified by the "flow A", in the expected sequence number register 23 and the accumulated packet number register 24, respectively (step S104). This results in that the expected sequence number register 23 is set to "2" and the accumulated packet number register 24 is set to "0".

This is followed by determining, by the main control section 27, whether the value of the sequence number 31 of the received packet 10 is equal to the value of the expected sequence number register 23 (step S106). The value of the sequence number 31 of the received packet 10 is "4" and the value of the expected sequence number register 23 is "2". Therefore, the main control section 27 determines they are not equal ("No" at step S106). The main control section 27 causes the sorting buffer 22 to record a packet entry 50 (step S107). At this time, the main control section 27 registers a new entry, using the "flow A" of the packet 10 for the flow information 51, "4" of the sequence number 31 of the packet 10 for the sequence number 52, and the packet 10 itself for the packet 53. Then, the main control section 27 increments the accumulated packet number register 24 by one (step S108). This results in that the value of the accumulated packet number register 24 is set to "1".

Thereafter, the main control section 27 registers a flow information entry 40 in the flow information table 21 (step S117). In the flow information table 21, a flow information entry 40 corresponding to the "flow A" is already present. Therefore, the main control section 27 updates the flow information entry 40 corresponding to the "flow A" by using the "flow A" of the packet 10 for the flow information 41, "2" of the expected sequence number register 23 for the expected sequence number 42, and "1" of the accumulated packet number register 23 for the accumulated packet number 43. The packet sorting device 1 thus completes the process of the packet 10 with the sequence number 31 of "4". Referring to FIG. 9, one can confirm the state of the flow information table 21 and the sorting buffer 22 after the processing of the packet 10 with the sequence number 31 of "4" (as shown in the row "AT TIMING WHEN PROCESS ON PACKET #4 IS COMPLETED" in FIG. 9).

Next, the packet sorting device 1 receives the third packet 10 belonging to the "flow A" (step S100). The flow information extracting section 26 extracts the "flow A" as the flow information 30 and "2" as the sequence number 31 from the packet 10 (step S101). The main control section 27 searches the flow information table 21 based on the "flow A" extracted by the flow information extracting section 26 (step S102). The main control section 27 determines whether there is a flow information entry 40 recording flow information 41 which matches the "flow A" in the flow information table 21 (step S103). As shown in FIG. 9 (in the row of "AT TIMING WHEN PROCESS ON PACKET #4 IS COMPLETED"), the flow information entry 40 corresponding to the "flow A" is present in the flow information table 21 at this time, whereby the search results in success ("Yes" at step S103). Therefore, the main control section 27 copies the expected sequence number 42 and the accumulated packet number 43 in the flow information entry 40 corresponding to the "flow A" for the expected sequence number register 23 and the accumulated packet number register 24, respectively (step S104). Therefore, the expected sequence number register 23 is set to "2" and the accumulated packet number register 24 is set to "1".

This is followed by determining, by the main control section 27, whether the value of the sequence number 31 of the received packet 10 is equal to the value of the expected sequence number register 23 (step S106). The value of the sequence number 31 of the received packet 10 is "2" and the value of the expected sequence number register 23 is also "2". Therefore, the main control section 27 determines they are equal (Yes at step S106). The main control section 27 outputs the packet 10 (with the sequence number 31 of "2") as the aligned packet 11 to the higher layer processing section 222 (step S109).

Thereafter, the main control section 27 updates the value of the expected sequence number register 23 to the expected value of the sequence number 31 which is to be received next by the packet sorting device 1 in the "flow A" (step S110). Therefore, the value of the expected sequence number register 23 is set to "3". Then, the main control section 27 determines whether or not the value of the accumulated packet register 24 is "0" (step S111). The value of the accumulated packet number register 24 is "1" as a result of the copying at step S104 ("No" at step S111). Therefore, the main control section 27 searches the sorting buffer 22 for a packet entry 50 which records the flow information 51 matching the flow information 30 of the received packet 10 and the sequence number 52 matching the value of the expected sequence number register 23 (step S112). Here, the main control section 27 searches the sorting buffer 22 for a packet entry 50 which is associated with the "flow A" and includes the sequence number 31 of "3". As shown in FIG. 9 (in the row "AT TIMING WHEN PROCESS ON PACKET #4 IS COMPLETED"), the packet entry 50 which satisfies this condition is not present, whereby the search by the main control section 27 results in failure ("No" at step S113).

Then, the main control section 27 records a flow information entry 40 in the flow information table 21 (step S117). At this time, the flow information entry 40 associated with the "flow A" is already present in the flow information table 21. Therefore, the main control section 27 updates the flow information entry 40 associated with the "flow A", using the "flow A" of the packet 10 for the flow information 41, "3" of the expected sequence number register 23 for the expected sequence number 42, and "1" of the accumulated packet number register 23 for the accumulated packet number 43. The packet sorting device 1 thus completes the process of the packet 10 with the sequence number 31 of "2". Referring to FIG. 9, one can confirm the state of the flow information table 21 and the sorting buffer 22 after the packet 10 with the sequence number 31 of "2" is processed (as shown in the row "AT TIMING WHEN PROCESS ON PACKET #2 IS COMPLETED" shown in FIG. 9).

Next, the packet sorting device 1 receives the fourth packet 10 belonging to the "flow A" (step S100). The flow information extracting section 26 extracts the "flow A" as the flow information 30 and "3" as the sequence number 31 from the packet 10 (step S101). The main control section 27 searches the flow information table 21 by using "flow A" extracted by the flow information extracting section 26 (step S102). The main control section 27 determines whether there is a flow information entry 40 which records flow information 30 associated with "flow A" in the flow information table 21 (step S103). As shown in FIG. 9 (in the row entitled "AT TIMING WHEN PROCESS ON PACKET #2 IS COMPLETED"), there is a flow information entry 40 associated with "flow A" in the flow information table 21 at this time, whereby the search results in success ("Yes" at step S103). Therefore, the main control section 27 copies the expected sequence number 42 and the accumulated packet number 43 in the flow information entry 40 associated with "flow A" into the expected sequence number register 23 and the accumulated packet number register 24, respectively (step S104). Therefore, the expected sequence number register 23 is set to "3" and the accumulated packet number register 24 is set to "1".

This is followed by determining, by the main control section 27, whether the value of the sequence number 31 of the received packet 10 is equal to the value of the expected sequence number register 23 (step S106). The value of the sequence number 31 of the received packet 10 is "3" and the value of the expected sequence number register 23 is also "3". Therefore, the main control section 27 determines they are equal (Yes at step S106). The main control section 27 outputs the packet 10 (with the sequence number 31 of "3") as the sorted packet 11 to the higher layer processing section 222 (step S109).

The main control section 27 updates the value of the expected sequence number register 23 to the expected value of the sequence number 31 which is to be received next by the packet sorting device 1 in the "flow A" (step S110). Therefore, the value of the expected sequence number register 23 is set to "4". Thereafter, the main control section 27 determines whether or not the value of the accumulated packet number register 24 is "0" (step S111). The value of the packer register 24 is "1" as a result of the copying at step S104 ("No" at step S111). Therefore, the main control section 27 searches the sorting buffer 22 for a packet entry 50 which records flow information 51 matching the flow information 30 of the received packet 10 (with the sequence number of "4"), and a sequence number 52 matching the value of the expected sequence number register 23 (step S112). Here, the main control section 27 searches for a packet entry 50 which is associated with "flow A" and includes the sequence number 31 of "4" (step S113). As shown in FIG. 9 (in the row "AT TIMING WHEN PROCESS ON PACKET #2 IS COMPLETED"), a packet entry 50 which satisfies this condition is present, whereby the search by the main control section 27 results in success ("Yes" at step S113).

Accordingly, the main control section 27 outputs the packet 53 (with the sequence number 31 of "4") which is stored in the searched packet entry 50 as the sorted packet 11 to the higher layer processing section 222 (step S114). Then, the main control section 27 deletes data of the packet entry 50 from which the packet 53 (with the sequence number 31 of "4") is outputted as the sorted packet 11 (step S115). The main control section 27 decrements the accumulated packet number register 24 by one (step S116). Therefore, the value of the accumulated packet number register 24 is set to "0".

Thereafter, the main control section 27 updates the value of the expected sequence number register 23 to the expected value of the sequence number 31 which is to be received next by the packet sorting device 1 in "flow A" (step S110). Therefore, the value of the expected sequence number register 23 is set to "5". Then, the main control section 27 determines whether the value of the accumulated packet register 24 is "0" (step S111). The value of the accumulated packet register 24 is "0" as a result of the decrement thereof by one at step S116 ("Yes" at step S111). That is, no packet 10 is accumulated in the sorting buffer 22.

Therefore, the main control section 27 registers a flow information entry 40 in the flow information table 21 (step S117). In the flow information table 21, the flow information entry 40 associated with the "flow A" is already present. Therefore, the main control section 27 updates the flow information entry 40 associated with "flow A", using "flow A" of the packet 10 for the flow information 41, "5" of the expected sequence number register 23 for the expected sequence number 42, and "0" of the accumulated packet number register 23 for the accumulated packet number 43. The packet sorting device 1 thus completes the process of the packet 10 with the sequence number 31 of "3". Referring to FIG. 9, one can confirm the state of the flow information table 21 and the sorting buffer 22 after the packet 10 with the sequence number 31 of "3" is processed (shown in the row "AT TIMING WHEN PROCESS ON PACKET #3 IS COMPLETED" in FIG. 9). The operation of the packet sorting device 1 in the present embodiment is as explained above by using the specific example.

In the packet sorting device 1 according to the present invention, the sorting buffer 22 is shared by all the flows which are processed by the packet sorting device 1. The sorting buffer 22 stores a packet(s) 10 so that the packet(s) 10 is correlated with the flow information 30 and the expected sequence number 42; even if a plurality of packets 10 having the same sequence number 31 belonging to different flows are registered therein, an appropriate sorting process can be carried out.

Such a configuration of the packet sorting device 1 according to the present invention effectively reduces the memory amount used for the sorting buffer, compared with a case in which the number of sorting buffers is equal to the number of flows. Therefore, a high-speed memory with a small capacity can be used as the sorting buffer, which effectively enhances the processing speed of the packet sorting device 1.

Moreover, the packet sorting device 1 does not search the sorting buffer 22 for a packet 53, when the value of the accumulated packet number 43 in the accumulated packet number register 24 is "0". The fact that the value of the accumulated packet number register 24 is "0" implies that no packet 53 associated with the relevant flow is accumulated in the sorting buffer 22. The packet sorting device 1 in the present embodiment thus eliminates redundant search, and the sorting buffer 22 is not accessed at all as long as packets 10 arrive at the packet sorting device 1 in the transmission order; this effectively improves the average processing performance.

Figure 10:
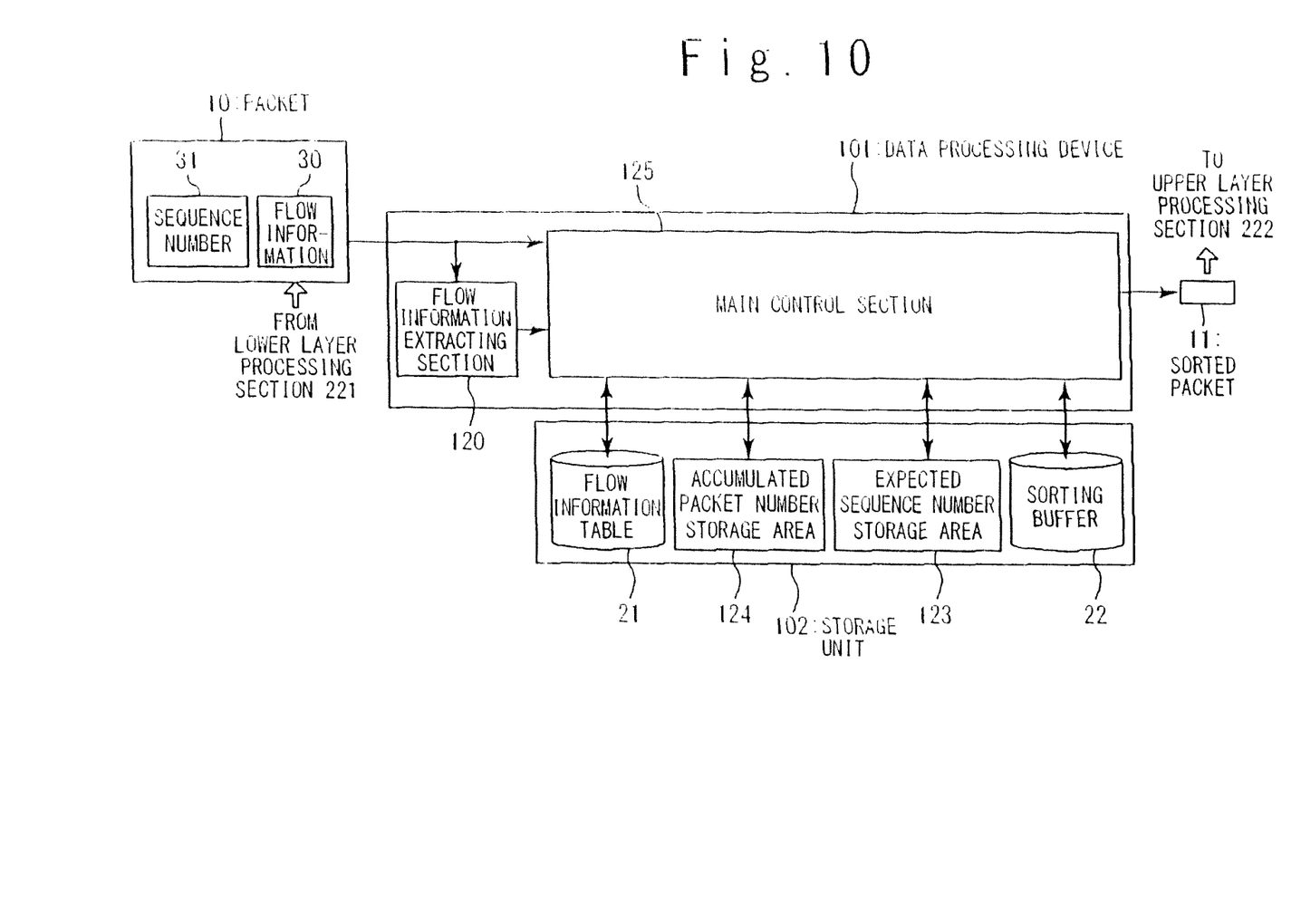
FIG. 10 shows the configuration of the packet sorting device 1 according to an embodiment of the present invention for a case when it is applied to an information processing apparatus.

A description is next given of another configuration example of the packet sorting device 1 according to the present invention. The packet sorting device 1 according to the present invention may be applied to an information processing device, such as Personal Computer (PC). FIG. 10 shows the configuration for a case when the packet sorting device 1 in the present embodiment is applied to an information processing device. Referring to FIG. 10, the packet sorting device 1 includes a data processing device 101 and a storage device 102.

The data processing device 101 is a control device such as a CPU. The data processing device 101 includes a flow information extracting section 120 and a main control section 125. The flow information extracting section 120 and the main control section 125 function and operate similarly to the flow information extracting section 26 and the main control section 27 in the aforementioned embodiments, respectively, and a detailed description thereof is not given here.

The storage device 102 is a recording medium, such as a RAM and an HDD. The storage device 102 includes a flow information table 21, a sorting buffer 22, an expected sequence number storage area 123, and an accumulated packet number storage area 124. The expected sequence number storage area 123 and the accumulated packet number storage area 124 correspond to the expected sequence number register 23 and the accumulated packet number register, which are provided in the form of hardware registers in the aforementioned embodiments, respectively, and store similar values. It should be noted that the flow information table 21 and the sorting buffer 22 are similar to those in the control unit 25 in the aforementioned embodiment, respectively, and a detailed description thereof is not given here. The packet sorting device 1 according to the present invention may be thus applied to an information processing device, such as a personal computer.

Although specific embodiments of the present invention are described above, the present invention is not limited to the above-described embodiments. Various changes which would be understood by the person skilled in the art may be made in the configuration and details of the present invention within the scope thereof.

This application claims priority based on Japanese patent application No. 2010-001852 filed on Jan. 7, 2010, the entire disclosure of which is incorporated herein by reference.

What is claimed is:

1. A packet sorting device, comprising:
    a sorting buffer shared by a plurality of communication flows;
    a flow information table storing expected sequence numbers so that said expected sequence numbers are each correlated with communication flow information which identifies a communication flow; and
    a control section which determines, when receiving one of a series of packets transmitted in a transmission order, whether said received one of said received packets is received in an order different from the transmission order of said series of packets, by extracting communication flow information and a sequence number included in said received one of said series of packets, and determining whether the sequence number extracted from said received one of said series of packets is equal to an expected sequence number which is correlated in the flow information table with the communication flow information included in said received one of said series of packets,
    wherein, when determining said received one of said series of packets is not received in the transmission order, said control section stores said received one of said series of packets as a disorder packet and communication flow information of the disorder packet in said sorting buffer so that the disorder packet and the communication flow information of the disorder packet are correlated,
    wherein said control section sorts said series of packets in a correct order by using said sorting buffer, and
    wherein said communication flow information of the disorder packet identifies the communication flow which the disorder packet belongs to.

2. The packet sorting device according to claim 1, further comprising an expected sequence number register, wherein the expected sequence number correlated with the communication flow information included in said received one of said series of packets in the flow information table is copied into the expected sequence number register upon reception of said received one of said series of packets,
    wherein, when determining said received one of said series of packets is not received in the transmission order, said control section additionally stores a sequence number of said received one of said series of packets in said sorting buffer so that the disorder packet and the sequence number of said received one of said series of packets are correlated,
    wherein, when said received one of said series of packets is received in the transmission order, said control section outputs said received one of said series of packets to a following stage, updates the expected sequence number stored in the expected sequence number register, and searches the sorting buffer for a following packet based on the updated expected sequence number,
    wherein said control section outputs a following packet to the following stage,
    wherein said following packet comprises a disorder packet which is stored in the sorting buffer and correlated in the sorting buffer with the communication flow information said received one of said series of packets and with the updated expected sequence number stored in the expected sequence number register.

3. The packet sorting device according to claim 1, wherein said flow information table stores accumulated packet numbers so that said accumulated packet numbers are correlated to said communication flow information and said expected sequence numbers,
    wherein said accumulated packet numbers each indicate a number of disorder packets stored in said storing buffer for each of said communication flows, and
    wherein said control section determines whether said disorder packet correlated to said communication flow information of said received one of said series of packets exists in said storing buffer, based on said accumulated packet numbers.

4. A reception device, comprising:
    a packet sorting device including:
        a sorting buffer shared by a plurality of communication flows;
        a flow information table storing expected sequence numbers so that said expected sequence numbers are each correlated with communication flow information which identifies a communication flow; and
        a control section which determines, when receiving one of a series of packets transmitted in a transmission order, whether said received one of said received packets is received in an order different from the transmission order of said series of packets, by extracting communication flow information and a sequence number included in said received one of said series of packets, and determining whether the sequence number extracted from said received one of said series of packets is equal to an expected sequence number which is correlated in the flow information table with the communication flow information included in said received one of said series of packets,
        wherein, when determining said received one of said series of packets is not received in the transmission order, said control section stores said received one of said series of packets as a disorder packet and communication flow information of the disorder packet in said sorting buffer so that the disorder packet and the communication flow information of the disorder packet are correlated, wherein said control section sorts said series of packets in a correct order by using said sorting buffer, and wherein said communication flow information of the disorder packet identifies the communication flow which the disorder packet belongs to.

5. The reception device according to claim 4, further comprising an expected sequence number register, wherein the expected sequence number correlated with the communication flow information included in said received one of said series of packets in the flow information table is copied into the expected sequence number register upon reception of said received one of said series of packets.

6. The reception device according to claim 5, wherein, when determining said received one of said series of packets is not received in the transmission order, said control section stores a sequence number of said received one of said series of packets in said sorting buffer so that the disorder packet and the sequence number of said received one of said series of packets are correlated.

7. The reception device according to claim 6, wherein, when said received one of said series of packets is received in the transmission order, said control section outputs said received one of said series of packets to a following stage, updates the expected sequence number stored in the expected sequence number register, and searches the sorting buffer for a following packet based on the updated expected sequence number.

8. The reception device according to claim 7, wherein said control section outputs a following packet to the following stage.

9. The reception device according to claim 8, wherein said following packet comprises a disorder packet which is stored in the sorting buffer and correlated in the sorting buffer with the communication flow information said received one of said series of packets and with the updated expected sequence number stored in the expected sequence number register.

10. A packet sorting method to be implemented in a packet sorting device including a sorting buffer shared by a plurality of communication flows, said method comprising:

receiving a series of packets transmitted in a transmission order;

upon reception of one of said series of packets, determining whether said one of said series of packets is received in an order different from the transmission order of said series of packets, by extracting communication flow information and a sequence number included in said received one of said series of packets, and determining whether the sequence number extracted from said received one of said series of packets is equal to an expected sequence number which is correlated in the flow information table with the communication flow information included in said received one of said series of packets;

when determining said received one of said series of packets is not received in the transmission order, storing said one of said series of packets as a disorder packet and communication flow information of said one of said series of packets in said sorting buffer so that the disorder packet and the communication flow information of the disorder packet are correlated; and outputting said series of packets after sorting said series of packets in a correct order, wherein said communication flow information of the disorder packet identifies the communication flow which the disorder packet belongs to.

11. The method according to claim 10, wherein the expected sequence number correlated with the communication flow information included in said received one of said series of packets in the flow information table is copied into an expected sequence number register upon reception of said received one of said series of packets.

12. The method according to claim 11, wherein, when determining said received one of said series of packets is not received in the transmission order, said control section stores a sequence number of said received one of said series of packets in said sorting buffer so that the disorder packet and the sequence number of said received one of said series of packets are correlated.

13. The method according to claim 12, wherein, when said received one of said series of packets is received in the transmission order, said control section outputs said received one of said series of packets to a following stage, updates the expected sequence number stored in the expected sequence number register, and searches the sorting buffer for a following packet based on the updated expected sequence number.

14. The method according to claim 13, wherein said control section outputs a following packet to the following stage.

15. The method according to claim 14, wherein said following packet comprises a disorder packet which is stored in the sorting buffer and correlated in the sorting buffer with the communication flow information said received one of said series of packets and with the updated expected sequence number stored in the expected sequence number register.

* * * * *